Sept. 23, 1969    H. G. POOLE    3,468,440
VEHICLES

Filed May 17, 1967    10 Sheets-Sheet 1

Inventor
Harold George Poole
by:
Watson, Cole, Grindle + Watson
Attorneys

Sept. 23, 1969   H. G. POOLE   3,468,440
VEHICLES

Filed May 17, 1967   10 Sheets-Sheet 2

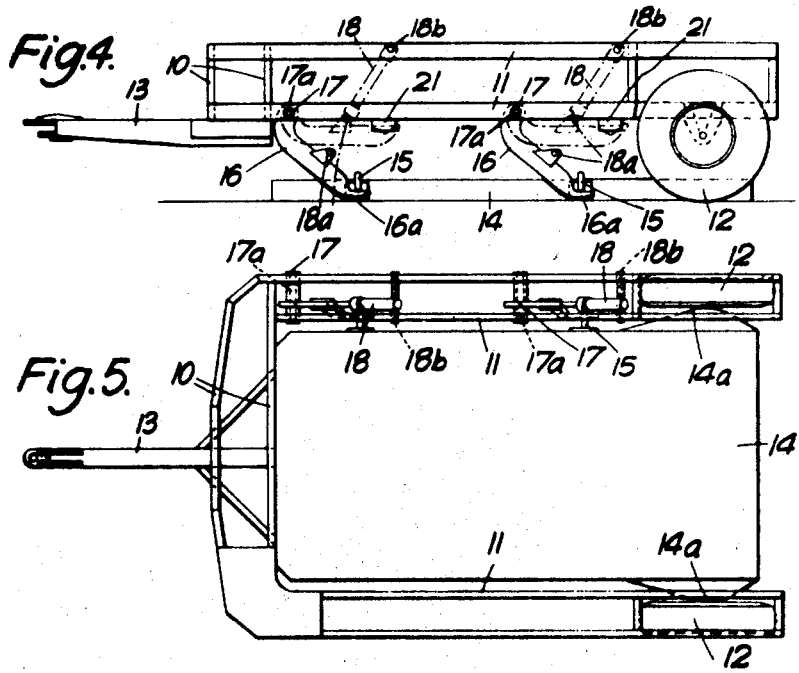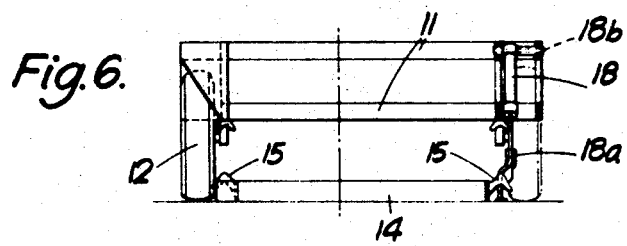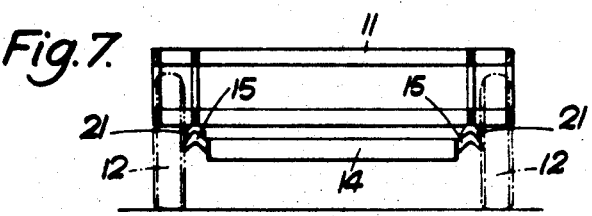

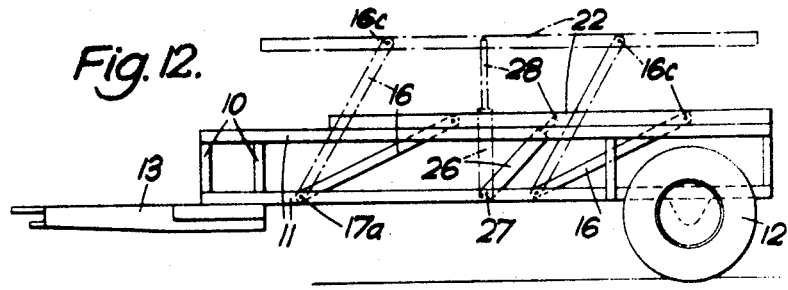
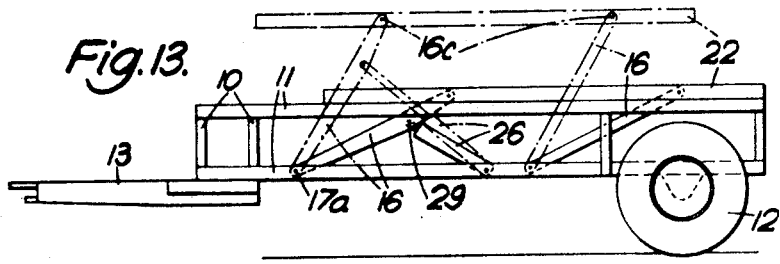
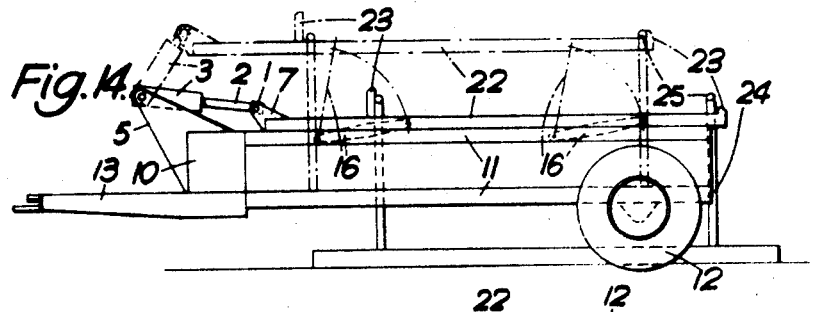
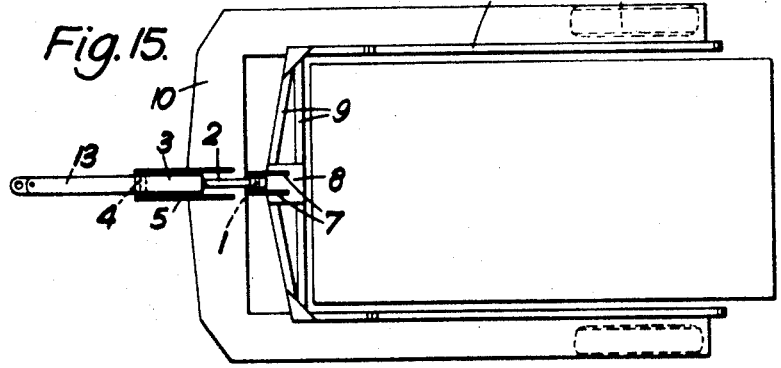

Sept. 23, 1969　　　　　H. G. POOLE　　　　　3,468,440
VEHICLES
Filed May 17, 1967　　　　　　　　　　　　10 Sheets-Sheet 6
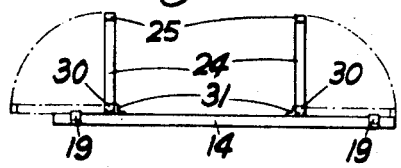
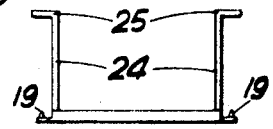
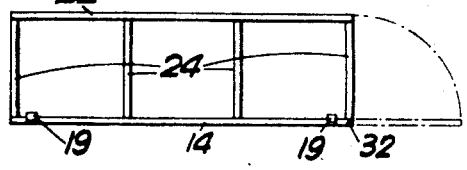
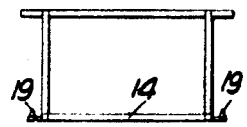
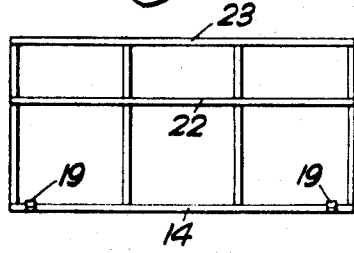
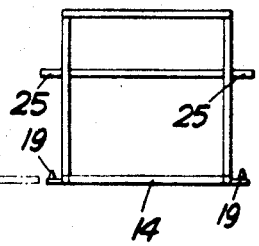
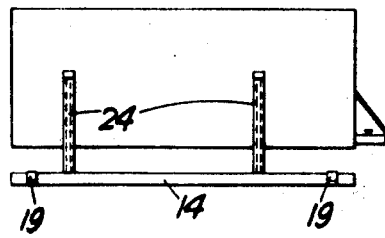
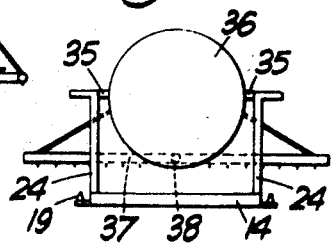

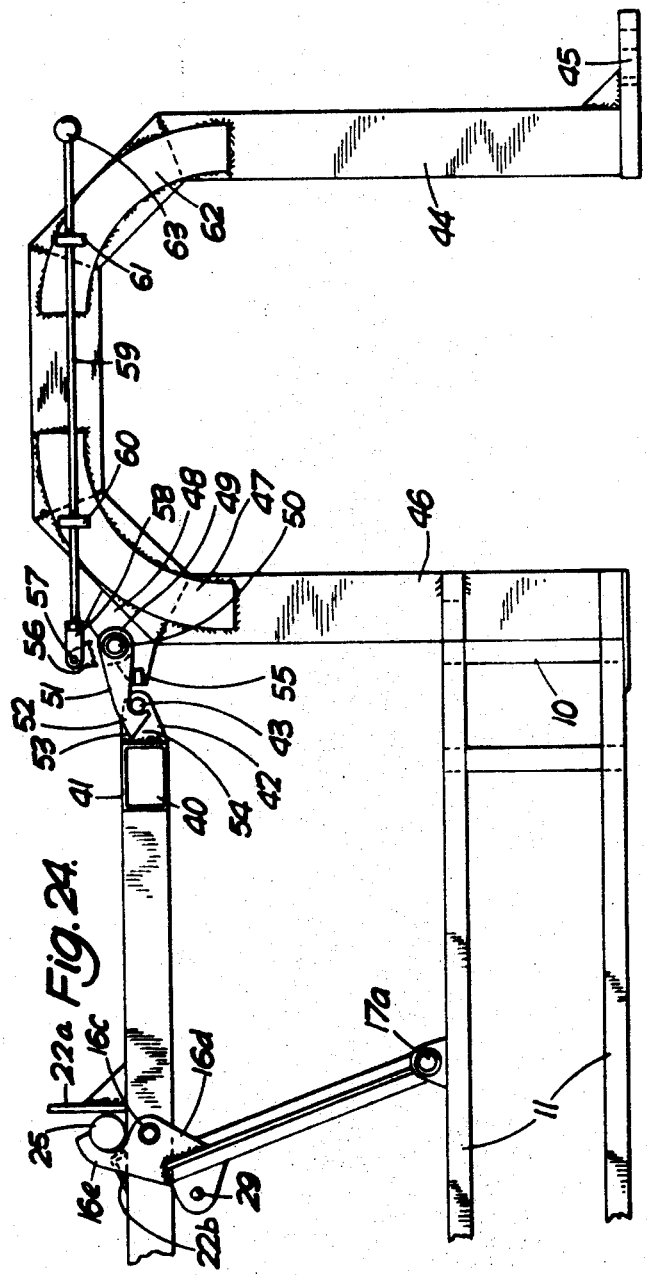

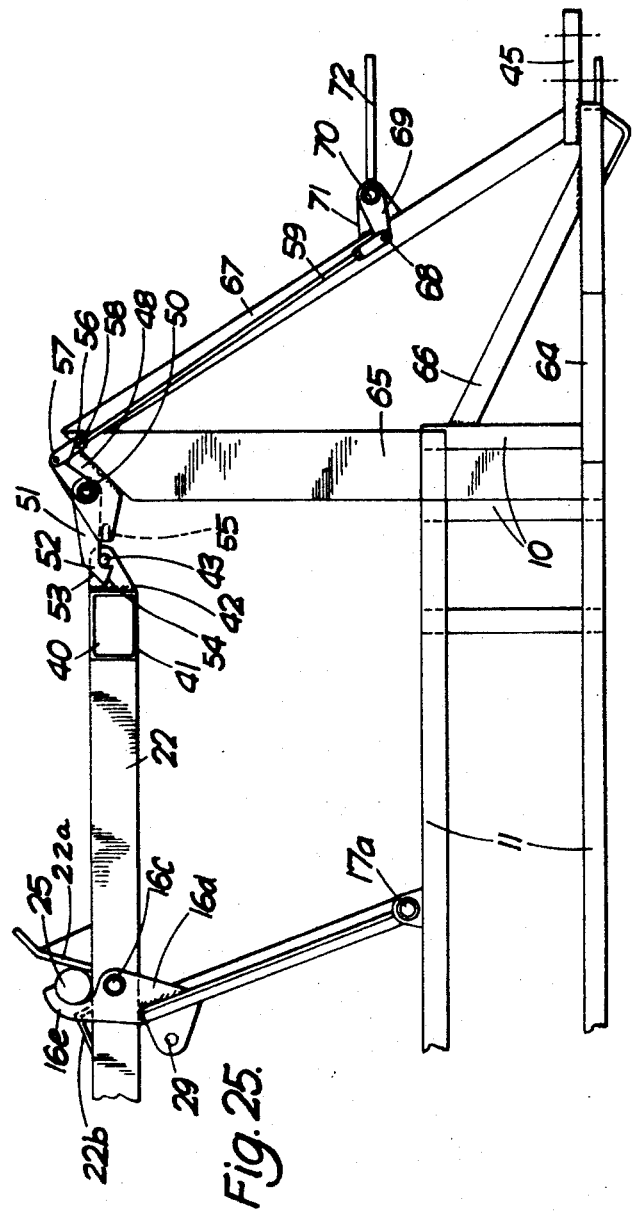

Sept. 23, 1969 H. G. POOLE 3,468,440
VEHICLES
Filed May 17, 1967 10 Sheets-Sheet 9
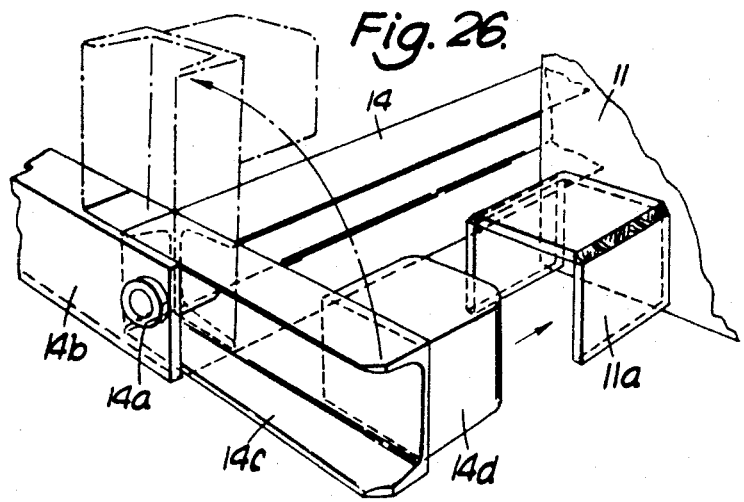
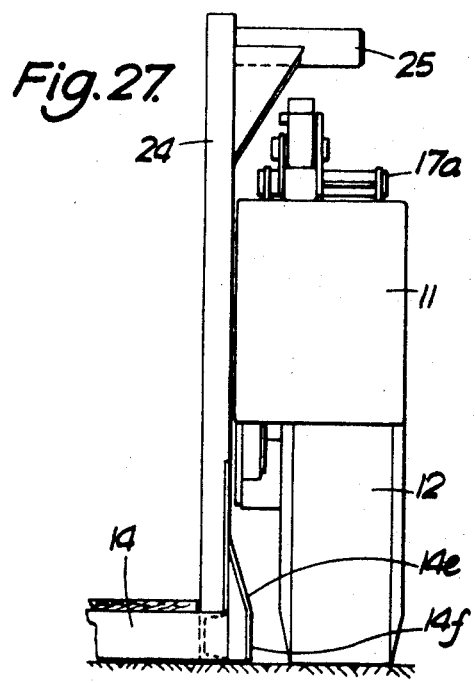

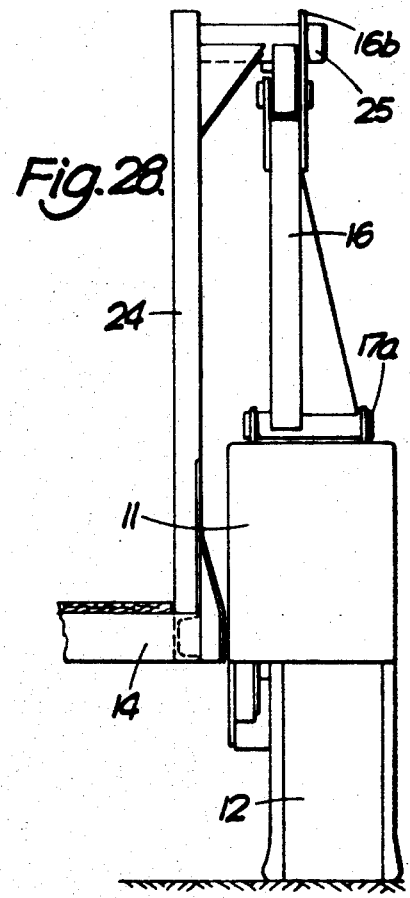
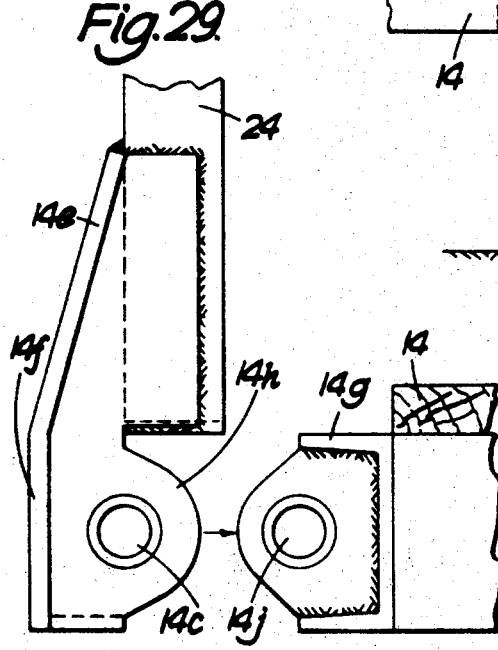

United States Patent Office 3,468,440
Patented Sept. 23, 1969

3,468,440
VEHICLES
Harold George Poole, Aspenden House, Aspenden, near
   Buntingford, Hertfordshire, England
Filed May 17, 1967, Ser. No. 639,223
Int. Cl. B60p 3/60
U.S. Cl. 214—390                               26 Claims

ABSTRACT OF THE DISCLOSURE

The invention comprises a U-shaped vehicle chassis which provides an unobstructed space between the limbs of the U into which a load supporting floor may be lifted from the ground by lifting means on the chassis. Interengaging means on the floor and chassis stiffen the latter. The floor may be locked in position by sliding bolts or by an automatically engaging lock. The chassis may comprise a trailer having a tow bar for connection to a tractor. The lifting means may comprise arms pivoted to the limbs which engage trunnions on the floor and which are swung upwardly by hydraulic rams.

---

This invention relates to vehicles and has for an object to facilitate the loading and unloading thereof. According to this invention a vehicle comprises a chassis structure which as viewed in plan is substantially U-shaped in configuration with the limbs directed rearwardly and providing an unobstructed space between them and the ground, a load supporting floor so dimensioned as to fit between said limbs, means for releasably holding said floor in position between the limbs and means on said load supporting floor and on the chassis structure which interengage one another when the floor is located between said limbs so as to stiffen said structure.

Releasable means may be provided for positively holding the floor in its raised position which means are hydraulically, mechanically or operator actuated.

Power or operator actuated mechanical means may be provided on the vehicle for raising and lowering said load supporting floor.

The said power actuated mechanical means may comprise hydraulic jacks controlled by valve gear which can operate as a hydraulic lock for holding the load supporting floor in position in said space in said chassis.

In an alternative arrangement said power or operator actuated mechanical means may comprise a cable and winch mechanism.

In one construction according to the invention said load supporting floor is formed with or has secured thereto a number of suspension members and the chassis structure is provided with a like number of lifting members and means for raising and lowering them and which lifting members are so constructed and arranged that when in their lowered position may be brought beneath the suspension members by appropriate maneuvering of the vehicle so that when the lifting members are raised they engage the suspension members and lift the floor into said space.

The aforesaid lifting members may comprise two bars extending respectively along the longitudinal members of the chassis structure which bars are movable in an up and down direction in relation thereto and the load supporting floor is provided along each side thereof with laterally extending portions so disposed that when the floor is resting on the ground the aforesaid laterally extending portions are at a higher level than the bars in their lower positions so that the bars may be passed beneath the laterally extending portions by movement of the vehicle and means for applying up and down movement to the bars. Various means for supporting the bars and for applying up and down movement to them are hereinafter described and claimed.

The aforesaid load supporting floor may be provided with guide means which engage parts on the chassis structure as the vehicle is moving along the ground and over said floor which guide means are so shaped that the floor is automatically centralised with respect to the fore and aft axis of the vehicle thus facilitating the engagement of the aforesaid locating means when the floor is raised.

The vehicle may be formed as a trailer and provided with a tow bar for attachment to a tractor. Alternatively the vehicle may be a self propelled vehicle having a U-shaped chassis structure and a front wheel drive thus leaving the aforesaid space unobstructed by the transmission.

A number of load carrying floors may be provided for the vehicle so that, for example, the goods requiring distribution from the central store can be distributed, using the floors in the manner of pallets, each of which floors after loading is raised and transported by the vehicle and lowered and left at a delivery point for unloading whilst the vehicle is returned to the central store to pick up and deliver another loaded floor.

The length of the limbs of the U-shaped chassis structure and the dimensions of the load supporting floors may be such that a number of floors may be arranged between the limbs in the direction of the length thereof.

With such an arrangement the said floors may be provided with detachable or foldable lateral extensions having projections engageable with sockets in said limbs when the floors are raised. It is only necessary that the rear end of the limbs of the U shall be provided with said socket, and the lateral extensions of certain of the floors may be detached or folded so that those floors may be raised between the limbs without obstruction. Further details of such an arrangement are referred to later.

In order to centralise the load supporting floor or floors with respect to the space between the limbs of the U-shaped chassis structure whilst the vehicle is being maneuvered into a pickup position, the free ends of the limbs as viewed in plan are provided on the inner sides thereof with guides which diverge with respect to one another as they extend towards the ends of the limbs which guides are engageable with the aforesaid uprights on the load supporting floor or floors.

Preferably the width of the load supporting floors is appreciably less than the distance apart of the limbs of the U-shaped chassis structure.

In order to prevent lateral play between a load supporting floor after it has been raised, there may be provided on opposite sides of the floor wedge shaped members so that when the floor is raised it is a jamming fit between said limbs.

Other features of the invention referred to in more detail later consist in the provision of means for preventing the bars which support the uprights of the load supporting floors from moving in a fore and aft direction when the floors have been raised and also for preventing relative up and down movement between the uprights and the bar.

The general mode of operation in lifting a loaded floor is as follows. After lowering the lifting members the vehicle is backed over the load bearing floor resting on the ground, so that parts of the lifting members underlie the laterally extending portions of the suspension members on the floor. The lifting members are then raised to bring the floor into the aforesaid unobstructed space between the longitudinal members of the chassis structure and when the vehicle reaches the required destination the lifting members are lowered until the floor rests on the ground whereupon the vehicle is moved forwardly bringing the laterally extending portions of the lifting members clear of the suspension members on the floor.

Other features of the invention are set out in the following description and claims. The description is made with reference to the accompanying drawings in which:

FIG. 3 is a rear elevation;

FIGURE 4 is a side elevation of a vehicle showing an alternative arrangement of the raising and lowering mechanism;

FIGURE 5 is a plan view of the arrangement shown in FIGURE 4;

FIGURE 6 is a rear view of the arrangement shown in FIGURE 4 and with the load carrying floor resting on the ground;

FIGURE 7 is a similar view to FIGURE 6 but showing the load carrying floor in a raised position;

FIGURE 12 is a similar view to FIGURE 8 showing a ram for operating the raising and lowering mechanism;

FIGURE 13 is a similar view to FIGURE 12 showing an alternative arrangement of the ram;

FIGURE 14 is a similar view to FIGURE 12 showing yet a further modification of the ram arrangement;

FIGURE 15 is a plan view of FIGURE 14;

FIGURE 16 is a side elevation of one form of pallet having collapsible suspension members;

FIGURE 17 is an end elevation of the pallet shown in FIGURE 16;

FIGURE 18 is a side elevation of another form of load bearing floor having a fixed superstructure;

FIGURE 19 is an end elevation of the arrangement shown in FIGURE 18;

FIGURE 20 is a side elevation of a load bearing floor also having a different form of fixed superstructure;

FIGURE 21 is an elevation of the arrangement shown in FIGURE 20;

FIGURE 22 is a side elevation of a load bearing floor carrying a spraying tank;

FIGURE 23 is an end elevation of the arrangement shown in FIGURE 20;

FIGURE 24 is a side elevation of the front part of the vehicle of FIGURE 1;

FIGURE 25 is a similar view of an alternative front part of the vehicle;

FIGURE 26 is a perspective view of one corner of a load supporting platform and the rear end of one of the ends of the U-shaped chassis structure;

FIGURE 27 is a rear view of one part of a lifting platform and of one limb of the U-shaped chassis structure showing the floor resting on the ground;

FIGURE 28 is a similar view to FIGURE 4 showing the load supporting floor in the elevated position; and FIGURE 29 is an end elevation of a corner of the load supporting floor.

Figure 1:
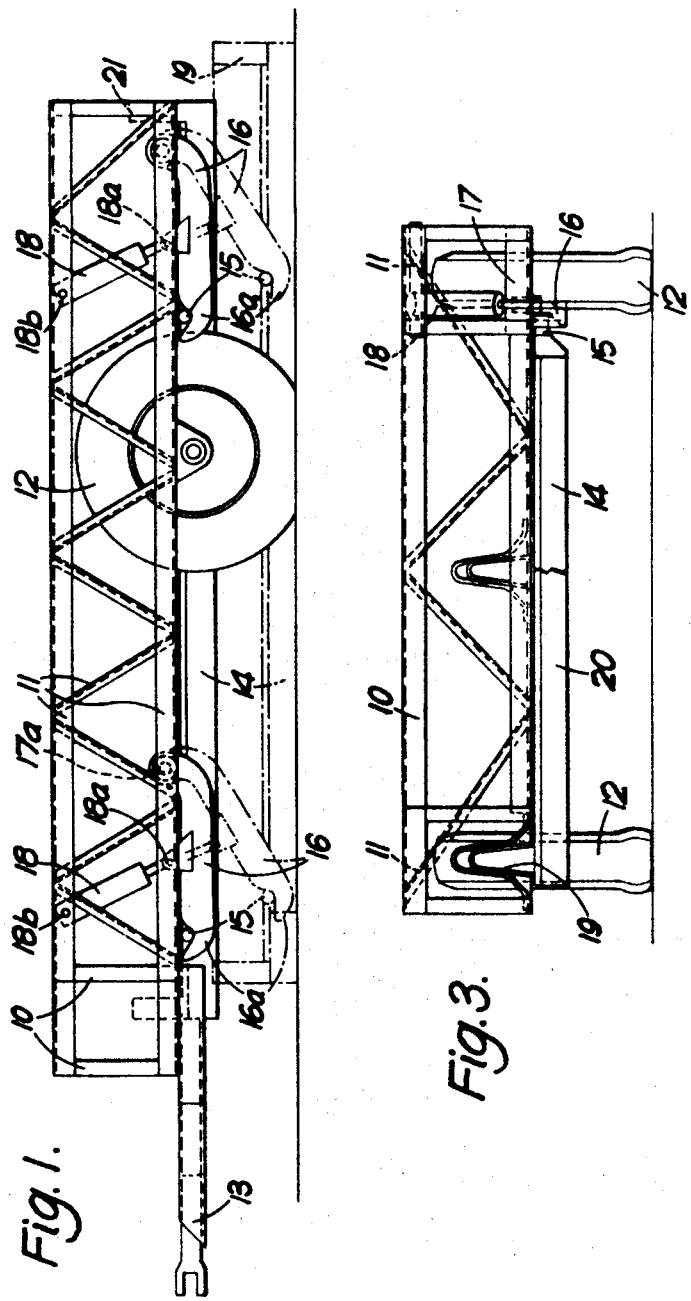
FIGURE 1 is a side elevation of a part of the vehicle with a detachable floor.
Figure 2:
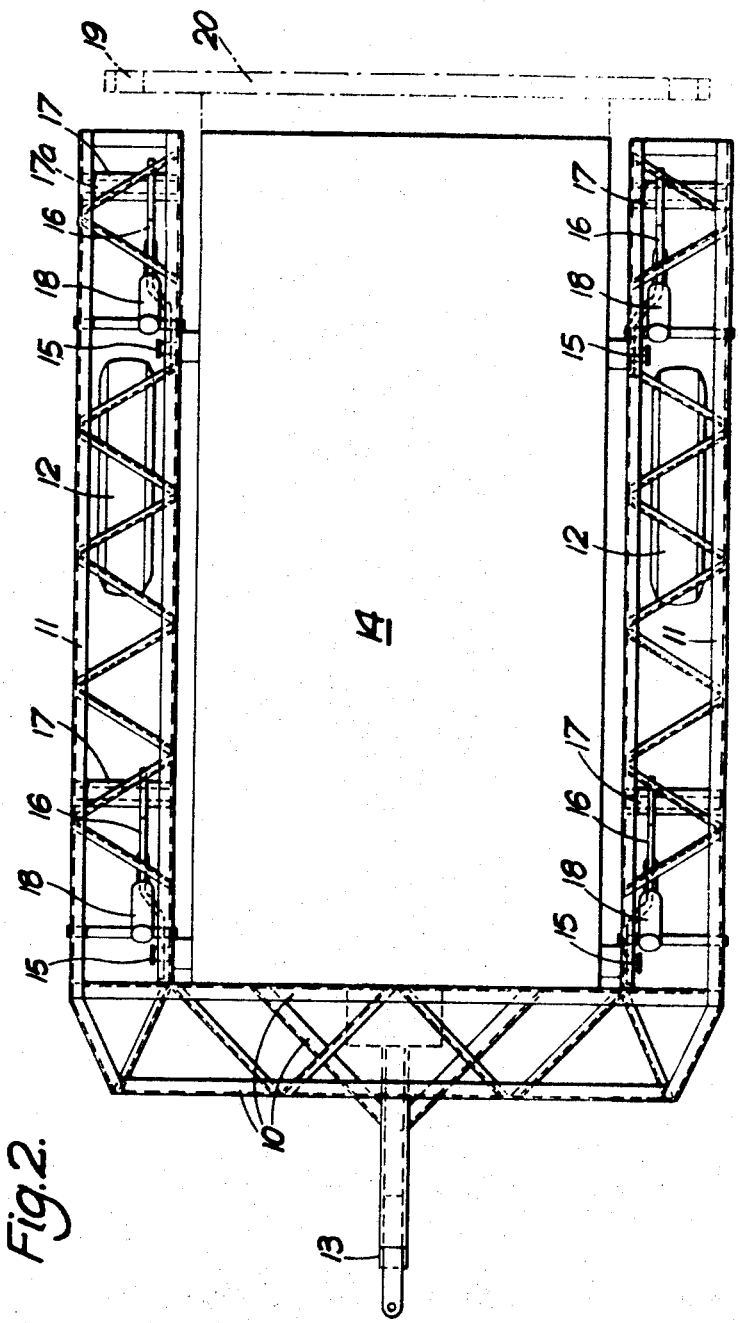
FIGURE 2 is a plan view.

Referring to the arrangement shown in FIGURES 1 to 3 the vehicle has a wheeled chassis structure comprising a front transverse girder member 10 and a pair of spaced girder-like side structural members 11 extending rearwards from the ends of the member 10. The members 11 are otherwise unjoined so that they laterally bound an unobstructed space or floor well and have their rear ends spaced apart to provide an entry to the well.

The members 11 have road wheels 12 mounted on them within their width.

The chassis structure may as shown be designed as a trailer vehicle being provided with a tow bar 13 or may form the rear end of a powered vehicle which has front wheel drive, or has a drive taken separately to the wheels 12, the drives being housed within the structural members 10, 11.

The vehicle also has a load bearing floor 14 which can be used like an industrial goods-handling pallet, and this floor is capable of being raised and lowered when within the well and of being detached completely from the chassis structure to facilitate loading and unloading and transport operations generally.

The floor 14 has along each side a pair of spaced laterally extending suspension members in the form of bosses 15 which project below the side structural members 11 but do not overlap the path of the wheels 12.

These suspension members or bosses 15 are engaged for lifting purposes by hooked ends 16a of lifting arms 16 mounted on the chassis structure. As will be seen from FIGURE 2, each lifting arm 16 is cranked outwards from its hooked end and has its opposite end rigid with a long bearing sleeve 17 by which the lifting arm is rotatively mounted on journals in the chassis structure. A hydraulic ram is pivotally connected at 18a and 18b to each arm and to the chassis structure whereby the floor may be lifted. As shown in FIGURE 1, it is preferred that the lifting arms 16 extend forwards from the sleeves 17 even when lowered; this facilitates the floor picking up operation. For instance, it may be arranged that as the wheeled chassis structure is backed with the arms 16 lowered, the lifting arms click over the suspension members or bosses 15 and then drop behind them so that, on forward movement of the chassis structure, the hooked ends engage below the bosses 15 reach for lifting.

Operation of the rams 18 to rotate the arms 16 to raise the floor 14, clearly causes an upward and forward movement of the floor and during this movement upward tapered projections 19 on the ends of a bar 20 secured to the rear of the floor are caused to enter corresponding recesses 21 in the members 11. Thereby lateral sway of the floor, when it is raised, is minimised and the side structural members are stiffened. Other locating features may be provided at the front end of the floor and in the member 10.

After the floor has been raised it may be positively held in the raised position by a number of reciprocably mounted bolts spaced apart on the members and which may be slid into sockets on the load bearing floor 14. The bolts may be hydraulically or mechanically or operator actuated by manipulation of a control valve (not shown) or the floor may be locked mechanically.

Also the valve gear associated with the rams may be employed for locking them in an extended condition.

The floor 14 may if desired be provided with upstanding sides and ends which may be hinged to or detachable from the floor as described later.

The arrangements shown in FIGURES 4 to 7 is similar to that described above with the exception that the lifting arms 16 extend rearwardly and the rams 18 are inclined oppositely to those of the first arrangement. Also the laterally extending members 15 instead of being in the form of bosses are inverted V shaped members 15 which are engaged by the hooked extremity 16a of the arms 16 and when these arms are raised they bring the V shaped members into recesses in socket members 21 on the chassis structure. The rear end of the load-supporting floor 14 is provided on each side thereof with guide means 14a which, when the vehicle is backed with the load bearing floor 14 resting on the gorund, engages the sides of the wheels 12 and locate the inverted V-shaped members 15 in an appropriate position for engaging the recesses in the members 21 when the arms 16 are raised.

Figure 8:
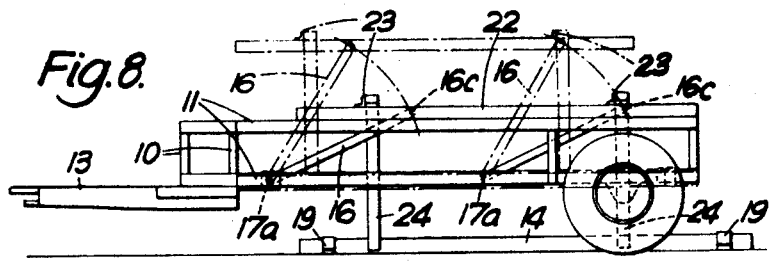
FIGURE 8 is a side elevation of a vehicle showing another form of raising and lowering mechanism but without the power means for actuating it.
Figure 10:
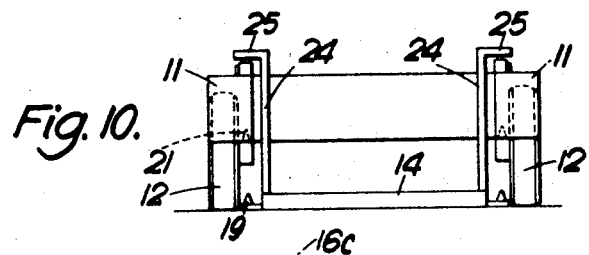
FIGURE 10 is a rear elevation of the arrangement shown in FIGURE 8.

In the arrangement shown in FIGURE 8 instead of the lifting arms 16 extending downwardly and rearwardly as in the last arrangement they extend upwardly and rearwardly on each side of the vehicle and their upper ends are pivotally connected at 16c to a longitudinally extending bar 22 to which are secured angle section stop members 23. When the arms 16 are in their lowermost position the bars 22 lie along the tops of the structural members 11. The load-supporting floor has fixed on each side thereof two spaced uprights 24 the upper ends of which are formed with or have secured thereto outwardly directed lateral portions 25. As the vehicle is being backed over a floor resting on the ground the uprights 24 pass between the members 11 of the vehicle structure, as best seen in FIGURE 10, and the laterally extending portions 25 overlie them and eventually stop members 23 engage the lateral portions whereafter lever arms 16 and bars 16c are raised in a manner hereinafter described. As in the construction of FIGURES 1 to 3 the ends of the load-supporting bearing floor is provided with projections 19 which engage with sockets 21 on the members 11 of the chassis structure.

Figure 11:
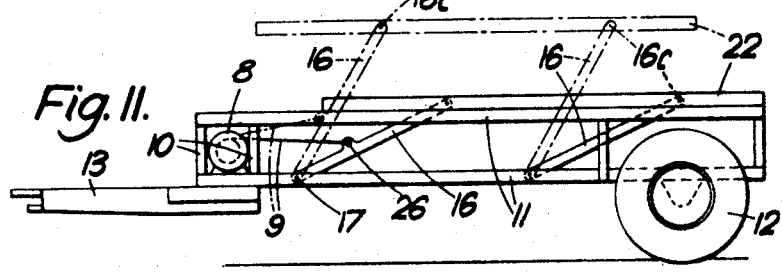
FIGURE 11 is a side elevation of a vehicle similar to that of FIGURE 8 and showing a winch and cable for operating the raising and lowering mechanism but omitting the lifting platform.

FIGURE 11 shows the manner in which the above mentioned lever arms 16 and bars 22 are raised and lowered by a winch 8. The winch is mounted on the transverse girder member 10 and may be provided with two drums each having a cable thereon one of which cables is shown at 9 and is connected at 26 to one of the arms 16 on one side of the vehicle and the other cable (not shown) being connected to another arm on the other side of the vehicle.

In the arrangement shown in FIGURE 12 a ram 26 is pivotally connected at 27 to the girder-like chassis structural member 11, the other end being pivotally connected at 28 to the bar 22. The same arrangement being provided on each side of the vehicle.

In the arrangement shown in FIGURES 14 and 15 the forward ends of the bars 22 are secured together by a cross structure 9 at the centre of which is secured a base plate 8 having spaced upwardly extending arms 7. The transverse girder member 10 also has spaced upwardly extending arms between which is pivoted at 5 the cylinder 3 of a ram, the piston rod 2 of which is pivotally connected at 1 to the arms 7. Thus a single ram is employed for raising and lowering the arms 2.

In the arrangement shown in FIGURE 13 instead of the ram 26 being pivotally connected to the bar 22 it is pivotally connected at 29 to one of the arms 16.

FIGURES 16 to 23 show various forms of load lifting platforms suitable for use with the vehicles shown in FIGURES 8 to 15.

In the arrangement shown in FIGURE 16 instead of the uprights 24, of FIGURES 8 to 13 being fixed to the load-supporting floor 14, they are pivotally attached at 30 so that they may be swung flat against the floor as indicated in chain lines and may be maintained in the upright position by angle stop members 31 secured to the floor.

In the arrangement shown in FIGURE 18 the load-supporting floor has fixed to it on each side thereof a superstructure comprising uprights 24 across the upper ends of which is secured the bar 22. The floor may also be provided with an end wall to form a box pallet the rear end wall being pivoted at 32 so that it may be swung downwardly in order to assist the loading of the floor.

The arrangement shown in FIGURES 20 and 21 are somewhat similar to that of FIGURES 18 and 19 but the superstructure on each side of the load-supporting floor 14 is higher and comprises two longitudinal members 22 and 23 the lower longitudinal member constituting the aforesaid bar and is provided with the laterally extending portions 25 for engagement by the lifting arms.

Figure 9:
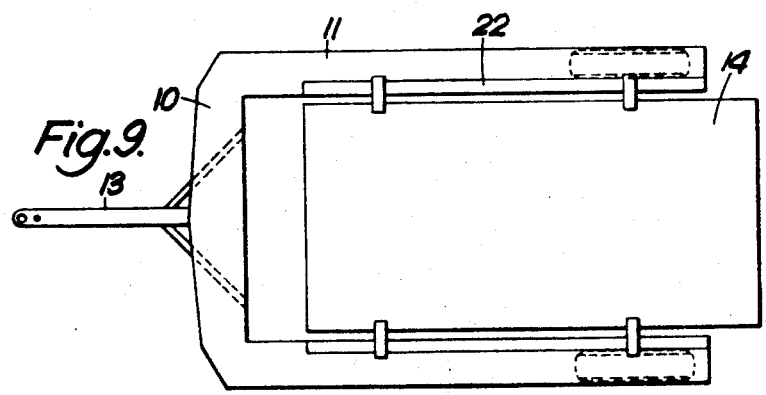
FIGURE 9 is a plan view of the arrangement shown in FIGURE 8.

The arrangement shown in FIGURES 22 and 23 is similar to that of FIGURES 8 to 10 but is formed with a cradle 35 for supporting a tank 36 provided with a spray bar 37 fed from the tank by a pipe 38.

The arrangement shown in FIGURES 24, 25 are somewhat similar to those shown in FIGURES 8 and 12. The vehicle however is shown the other way around. As in those constructions the load supporting floor (not shown) is provided with uprights (also not shown) which at their upper ends are provided with outwardly and laterally extending projections 25 of circular cross section (indicated in chain lines). Each of the limbs 11 of the U-shaped chassis structure has pivoted to it two links one of which is indicated at 16, the pivotal connection being indicated at 17a. The outer end of each arm is pivotally connected at 16c to a horizontal bar 22 which when the vehicle is not carrying a load supporting floor rests along the top of the limb 11. The bar 22, link 16 and a part of the limb 11 thus forms a parallel linkage. The rear extremity of each limb 11 supports an axle for a wheel (not shown).

Rigidly fixed to the outer end of each link or arm 16 is a bracket 16d provided with one part 16c of a pivotal connection and which bracket is also provided with a hook-shaped extremity 16e. Each of the bars 22 is provided towards its forward end with an upstanding abutment 22a which as the vehicle is being backed over the load supporting floor resting on the ground comes into contact with the laterally extending projection 25 on the forward upright of the load supporting floor (not shown) and spaced rearwardly from this abutment 22a are locating members 22b. Two similar locating members (not shown) are secured to the upper part of the bar 22 for cooperation with the lateral projections on the rear post of the load supporting floor.

As in FIGURE 12 the cylinder of a hydraulic ram (not shown) is pivoted to the lower member of each limb 11 and the plunger of each ram is pivoted at 29 to a part of the bracket 6d fixed towards the forward end of the bar 22. With this arrangement as the rams are extended the bars 22 are swung upwardly and forwardly and the projection 25 passes into the socket formed between the abutments 22b at the forward end and into the socket formed by the two locating members at the rearward ends of the bar 22.

As the arms 16 on each limb 11 swing upwardly and the hook-shaped part 16c at the end of the movement overlie the lateral projections 25 and hold them in the sockets on the bar 22 thus preventing relative up and down movement between those parts.

As will be seen from FIGURE 24 the forward ends of bars 22 are connected together by a cross bar 40 which at its centre is connected by a sleeve 41 having welded to it two lugs 42 between which extends a pin 43. The trailer may be arranged for use with a tractor having a draw bar in the form of a goose neck shown to the right of FIGURE 24, the lower end of one of its limbs 44 being provided with a foot piece 45 for attachment to the tractor and a rear downwardly extending part 46 for pivotal attachment to the chassis structure 11 of the trailer. Secured on each side of a bend of the gooseneck is a plate 47 and welded to the edge of each plate is a lug 48 having a hollow boss 49 and extending through the two hollow bosses is a pin 50. Fixed to the pin 50 is an arm 51 having a hook 52 at its extremity arranged to engage the pin 43 and the upper and lower edges 53, 54 of the hook are inclined in relation to one another. A cross-piece 55 is arranged between the two lugs 48 which limits the downward movement of the arm 51, the arrangement being such that as the bars 22 are being raised the pin may strike the inclined under end 54 and then pass into the hook. Fixed also to the pin 50 is a crank arm 56 which is pivoted at 57 between the fork arms 58 and the end of a control rod 59. The control rod passes through bearings in lugs 60 fixed to one of the plates 47 and also through a bearing in another lug 61 fixed to one of two plates 61, 62 secured to the other side of the other bend of the gooseneck. The forward extremity of the rod 59 is provided with a manipulating knob 63. By these means when the table 14 has been raised to its uppermost position the pin 43 is automatically engaged by the hook 52 and is retained in this upper position against fore and aft movement. When it is desired to lower the arms 22 again the control rod 59 is moved to the right disengaging the hook from the pin 43.

The arrangement shown in FIGURE 25 is very similar to that described above but instead of the trailer being attached to the tractor by a gooseneck the trailer is provided with a straight tow bar 64 which is braced to an upright 65 by two inclined bracing members 66, 67. The forward end of the tow bar 64 has secured to it a plate 45 similar to the plate 45 of the first construction which plate is secured to a part of the tractor by means permitting pivotal movement about a vertical axis. The plates 48, on which the hook-shaped part 51 and lever arm 56 are pivotally mounted at 50, are secured to the upper end of the upright 65. The actuating rod 59 extends along the inclined bracing member 67 and is pivotally connected at 68 to a lever arm 69 secured to a pin 70 pivotally mounted in bearings in two lugs 71 secured to the inclined member 67. The pin 70 also has fixed to it a manipulating member 71.

The hook when in an engaged position prevents fore and aft movement of the load supporting floors.

Referring now to FIGURE 26 the rear end of each limb 11 of the U-shaped structure is provided, on the lower part thereof with an inverted U-shaped socket 11a.

Pivoted at 14a to each end of a rear member 14b of the load carrying floor 14 is an extension 14c arranged to be such that the extension 14c in its lowermost position forms a continuation of the member 14b.

Fixed to the extension 14c is a forwardly extending block 14d which, at the completion of the upward and forward swinging movement of the load supporting floor 14, enters the socket 11 in the direction of the arrow shown in the drawing where it is a tight fit and thus the cross-member 14b and the extension 14c brace together the two limbs of the U-shaped chassis structure.

As indicated earlier in the specification when more than one load supporting floor requires to be located between the limbs of the U-shaped structure all of them except the rearmost one has its extension 14c swung upwardly into the position shown in the dotted lines so that they may lie between the limbs 11 of the U-shaped structure.

Referring now to FIGURES 27 and 28 it will be seen that the lower ends of the uprights 24 of the load supporting floor 14 are provided with taper-shaped members 14c terminating at their lower ends in straight portions 14f so that during the upward movement of the load supporting floor it is centralised between the two limbs 11 of the U-shaped structure. The rear ends of the limbs 11 may be so shaped that the inner sides thereof diverge as they extend rearwardly and are provided with guide plates which as the vehicle is being backed engage the uprights 24 of the load supporting floor and centralise them between the limbs 11.

Referring now to FIGURE 29 this shows an arrangement in which each upright 24 is pivotally mounted in a bracket 14g on one side of the floor, for which purpose the aforesaid guide members 14e, 14f is provided with a boss 14b having a floor 14i which may be brought into register with a bore 14j in the bracket 14g and a pivot pin (not shown) is passed through these bores. Thus the uprights 24 can be swung laterally away from the floor 14 for loading and unloading purposes.

I claim:
1. A vehicle comprising
   (a) a chassis structure which as viewed in plan is substantially U-shaped,
   (b) a load supporting floor for location between the limbs of the U-shaped structure,
   (c) means for raising, lowering and releasably holding said floor in position between the limbs, and
   (d) wedge-shaped means on the floor engaging complementary means on the chassis structure for stiffening the chassis structure by preventing lateral movements of the limbs towards and away from the floor when the floor is located in the structure.

2. A vehicle according to claim 1 wherein releasable means (52, 43, FIGURES 24 and 25) are provided for positively holding the floor in its raised position which means are hydraulically mechanically or operator actuated.

3. A vehicle according to claim 1 wherein power means (18, FIGURES 1, 4; 24, FIGURE 11; 26, FIGURES 12 and 3; 2, 3, FIGURE 15) or operator actuated mechanical means are provided on the vehicle for raising and lowering said load supporting floor.

4. A vehicle according to claim 3 wherein said power actuated mechanical means for raising or lowering the load supporting floor comprise a hydraulic jacking system controlled by valve gear.

5. A vehicle according to claim 3 wherein said power or operator actuated mechanical means comprises a cable and winch mechanism (24).

6. A vehicle according to claim 1 wherein said load supporting floor (14) is provided with guide means (14a, FIGURE 5) which may engage parts on the chassis structure as the vehicle is moving along the ground, over said floor which guide means are so shaped that the floor is automatically centralised with respect to the fore and aft axis of the vehicle.

7. A vehicle according to claim 1 characterised in that the length of the limbs (11) of the U-shaped structure and the dimensions of the load supporting floors (14) are so chosen that a number of the floors may be arranged between the limbs in the direction of the lengths of the limbs and said floors may be provided with detachable or foldable lateral extensions (14c) provided with projections (14d) engageable with sockets 11a) in said limbs when the floors are raised.

8. A vehicle according to claim 7 wherein said limbs 11 are provided with sockets (11a) only at or near their free extremities and said lateral extensions (14c) of certain of the floors may be detached or folded so as to be clear of the limbs except for that floor which is disposed nearest the free ends of the limbs.

9. A vehicle according to claim 7 and in which the load supporting floors (14) are each provided with uprights (24) on each side thereof the upper ends of which are provided with projections (25) which may overlie one or other of two longitudinally extending bars (22) associated with respect to the two limbs (11) of the structure and which bars are raised by a lifting mechanism (16, 26) whereby the one lifting mechanism operates simultaneously on all the load supporting floors 14.

10. A vehicle according to claim 9 wherein said load supporting floor (14) is formed with or has secured thereto a number of suspension members (15) and the chassis structure (11) is provided with lifting members (16) for engagement therewith and means (18) for raising and lowering them and which lifting members (16) are so constructed and arranged when in their lowered position they may be brought beneath the suspension members (15) by appropriate maneuvering of the vehicle so that when the lifting members (16) are raised they engage the suspension members (15) and lift the floor (14) into said space.

11. A vehicle according to claim 10 wherein the lifting members comprise lever arms (16) pivoted to the chassis (11) structure to swing in an up and down direction, and when in their lower positions may be brought beneath the suspension members (15) on the floor (14) by movement of the vehicle.

12. A vehicle according to claim 11 wherein up and down swinging movement is imparted to each said lever arm by a jack (18) pivotally connected between it and a part (11) of said chassis structure.

13. A vehicle according to claim 10 wherein the lifting member comprises two bars (22, FIGURES 8 to 11) extending respectively along the longitudinal members

(11) of the chassis structure and are movable in an up and down direction in relation thereto and wherein the load supporting floor (14) is provided along each side thereof with laterally extending portions (25) so disposed that when the floor rests on the ground the laterally extending portions are at a higher level than the bars (22) so that the bars may be passed beneath them by movement of the vehicle and means (24) for applying up and down movement to the bars (22).

14. A vehicle according to claim 13 wherein each said bar (22) extends along a longitudinal member of the chassis structure and is connected thereto by a number of lever arms (16) so that it may swing in an up and down direction.

15. A vehicle according to claim 14 wherein either one or more jacks (26, FIGURE 12) is or are pivotally connected between each limb (11) of the U-shaped chassis structure and one of said bars (22) or between each said limb (11) and one or more of said lever arms (16, FIGURE 13).

16. A vehicle according to claim 15 wherein said arms (16) at one end are secured together by a cross member and a single jack is provided between the centre of that cross member and the chassis structure.

17. A vehicle according to claim 14 wherein swinging movement is imparted to said lever arms (16) by cables attached thereto from a cable and winch mechanism (24).

18. A vehicle according to claim 13 wherein each laterally extending portion (25) is formed on or fixed to the upper end of a suspension member (24) either fixed to (FIGURE 18) or pivoted to (FIGURE 16) said load supporting floor (14).

19. A vehicle according to claim 13 wherein said laterally extending portions (25) are attached to a superstructure (FIGURES 18 to 21) extending along each side of the load supporting floor (14).

20. A vehicle according to claim 1 wherein the free ends of the limbs of the U-shaped chassis structure as viewed in plan are provided on the inner sides thereof guides (not shown) which diverge with respect to to one another as they extend towards the ends of the limbs which guides are engageable with the aforesaid uprights on the load supporting floor or floors.

21. A vehicle according to claim 1 wherein the width of the load supporting floors (14) is appreciably less than the distance between the limbs (11) of the U-shaped chassis structure.

22. A vehicle according to claim 14 wherein there are provided on an elevated portion (65) of the chassis structure a catch (51) so designed as to automatically engage parts (43) of said longitudinal members (22) or to said lever arm when the load supporting floor reaches the uppermost position thus holding it in that position against fore and aft movement.

23. A vehicle according to claim 22 wherein manually operated means are provided for releasing said catches.

24. A vehicle according to claim 14 wherein there are provided retaining means on certain of the lever arms which by reason of the articular movement of those lever arms in relation to said longitudinal members when the latter are being raised bring the retaining means over the laterally extending projections of the load supporting floor and prevent up and down movement of the lateral projections in relation to the longitudinal member.

25. A vehicle according to claim 1 and formed as a trailer and provided with a tow bar (13) for attachment to a tractor.

26. A vehicle according to claim 2 wherein said releasable holding means are automatically engageable.

References Cited

UNITED STATES PATENTS

| | | | |
|---|---|---|---|
| 2,693,288 | 11/1954 | Black | 214—390 |
| 2,897,989 | 8/1959 | Hounsell | 214—390 |
| 2,822,944 | 2/1958 | Blomgren | 214—390 |
| 2,934,228 | 5/1960 | Hillberg | 214—390 |
| 3,024,931 | 3/1962 | Grover et al. | |
| 3,083,850 | 4/1963 | Owen | 214—390 |

ALBERT J. MAKAY, Primary Examiner